United States Patent
McGreevy et al.

(10) Patent No.: US 9,117,184 B2
(45) Date of Patent: Aug. 25, 2015

(54) INDUSTRIAL AUTOMATION INTERFACES INTEGRATED WITH ENTERPRISE MANUFACTURING INTELLIGENCE (EMI) SYSTEMS

(75) Inventors: Robert Joseph McGreevy, Oswego, IL (US); Michael John Pantaleano, Willoughly, OH (US); Bruce Gordon Fuller, Edmonton (CA); Ian Edward Tooke, Barrie (CA); Kevin John Albert, Elm Grove, WI (US); John Joseph Baier, Mentor, OH (US); Jan Pingel, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 993 days.

(21) Appl. No.: 13/205,410

(22) Filed: Aug. 8, 2011

(65) Prior Publication Data
US 2012/0029678 A1    Feb. 2, 2012

Related U.S. Application Data

(63) Continuation of application No. 12/242,141, filed on Sep. 30, 2008, now Pat. No. 8,010,218.

(51) Int. Cl.
G06F 19/00    (2011.01)
G06Q 10/06   (2012.01)

(52) U.S. Cl.
CPC ............ *G06Q 10/06* (2013.01); *G06Q 10/0631* (2013.01); *G06Q 10/0633* (2013.01)

(58) Field of Classification Search
CPC .......................... G06Q 10/06; G05B 19/41865
USPC .......................................................... 700/108
See application file for complete search history.

(56) References Cited

U.S. PATENT DOCUMENTS

| 5,835,898 | A   | * | 11/1998 | Borg et al. ................... 705/7.12 |
| 6,671,593 | B2  | * | 12/2003 | Sinex .......................... 701/29.4 |
| 6,772,033 | B2  | * | 8/2004  | Scherer et al. ................ 700/115 |
| 7,676,294 | B2  |   | 3/2010  | Baier et al. |
| 8,108,790 | B2  | * | 1/2012  | Morrison et al. ............. 715/771 |
| 2002/0002560 | A1 | * | 1/2002 | Shah et al. ..................... 707/200 |
| 2002/0099464 | A1 | * | 7/2002 | O'Connor et al. ............ 700/117 |
| 2004/0236451 | A1 |   | 11/2004 | Parsons et al. |
| 2010/0042283 | A1 | * | 2/2010 | Kell et al. ........................ 701/29 |

OTHER PUBLICATIONS

OA dated Dec. 13, 2010 for U.S. Appl. No. 12/242,141, 17 pages.
Notice of allowance dated Apr. 21, 2011 for U.S. Appl. No. 12/242,141, 21 pages.

* cited by examiner

Primary Examiner — Robert Fennema
Assistant Examiner — Sivalingam Sivanesan
(74) Attorney, Agent, or Firm — Amin, Turocy & Watson, LLP

(57) ABSTRACT

A visualization system integrated with an enterprise manufacturing intelligence (EMI) system utilizing preconfigured EMI data models, workflow reports and process event notifications to optimize a manufacturing process. The visualization system and the EMI system exchange data and information providing both systems with a broader process view than either system has independently. The visualization system can specifically target information and action requests to different classes of manufacturing personnel such as operators and engineers. Additionally, the visualization system maintains an audit log of all production identities, raw material usage, and requested corrective actions.

18 Claims, 12 Drawing Sheets

INDUSTRIAL AUTOMATION INTERFACES INTEGRATED WITH ENTERPRISE MANUFACTURING INTELLIGENCE (EMI) SYSTEMS

CROSS-REFERENCE TO RELATED APPLICATIONS

This application is a continuation of U.S. patent application Ser. No. 12/242,141, filed Sep. 30, 2008. The entirety of the foregoing is incorporated herein by reference.

TECHNICAL FIELD

The subject invention relates generally to industrial control systems, and more particularly to visualization systems that interact with industrial control systems, process operators and process engineers based in part on exchanging data with an enterprise manufacturing intelligence system for generating workflow schedules and maintenance work orders.

BACKGROUND

Industrial controllers are special-purpose computers utilized for controlling industrial processes, manufacturing equipment, and other factory automation, such as data collection or networked systems. One type of industrial controller at the core of an industrial control system is a logic processor such as a programmable logic controller (PLC) or personal computer (PC) based controller. Programmable logic controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs.

Connected to the PLC are input/output (I/O) devices. I/O devices provide connection to the PLC for both automated data collection devices such as limit switches, photoeyes, load cells, thermocouples, etc. and manual data collection devices such as keypads, keyboards, pushbuttons, etc. Differences in PLCs are typically dependent on number of I/O they can process, amount of memory, number and type instructions and speed of the PLC central processing unit (CPU).

Another type of industrial controller at the core of an industrial control system is the process controller of a distributed control system (DCS). The process controller is typically programmed by a control engineer for continuous process control such as an oil refinery or a bulk chemical manufacturing plant. A control engineer typically configures control elements such as proportional-integral-derivative (PID) control loops to continuously sample the I/O data, known as the process variable, from the process, compare the process variable to a configured set point and output an error signal, proportional to the difference between the set point and the process variable, to the control device. The control device then adjusts the element controlling the process property, such as a valve in a pipe for flow control or a heating element in a distillation column for temperature control, in an attempt to minimize the error signal. As the DCS name implies, many process controllers are distributed around the process and are communicatively coupled to each other forming the overall control system.

Connected to the process controller are similar types of I/O devices as connected to the PLC and additionally, intelligent I/O devices more common to the process control industry. These intelligent devices have embedded processors capable of performing further calculations or linearization of the I/O data before transmission to the process controller.

A visualization system is generally connected to the industrial controller to provide a human-friendly view into the process instrumented for monitoring or control. The user of a visualization system configures one or more graphical displays representing some aspect of the process the industrial controller is controlling or monitoring. The graphical displays each contain a user configured number of data values collected from the I/O connected to the industrial controller and considered by the user as relevant to the particular graphical display or process area of interest. Other data points may be configured strictly for archival purposes or to generate reports related to interests such as production, downtime, operator efficiency, raw material usage, etc.

Although the visualization system effectively represents the process of interest and provides a means for the operator to monitor or control the process, the intelligence to troubleshoot the process, recognize patterns that will most probably lead to downtime or determine the most expedient action to take to return the process to optimal operating conditions remains knowledge held by the operator. Operators develop an intimate understanding of the process and its unit operations over long periods of time spent managing operations. During this time, the operator, through experience, develops a feel for whether the process is operating at peak efficiency based on familiarity with the process. In some cases a visualization system can collect relevant data but in many cases, without the operators' guidance, it is difficult or impossible to associate a particular set of process conditions with a particular process problem.

However, the presence of an experienced operator does not completely address the scope of problems that can be associated with a manufacturing process. Many industrial process problems are not apparent until they are viewed in light of process conditions outside of the operators' view. For instance, product quality analysis based on laboratory techniques or sophisticated chemical analysis. Other problems such as raw material availability may not be visible to the operator. Addressing these higher level and more complex problems requires the use of Enterprise Manufacturing Intelligence (EMI) systems and access by these systems to process data. After the EMI system has analyzed the data in combination with other data such as material availability and business requirements, the EMI system generates daily, weekly or monthly workflow schedules and maintenance work orders based on the best available data.

The power of this information as it is fed back to the localized process operators and engineers has created market pressure to automate the cycle of providing process data to an EMI system and receiving and acting on the results of the analysis performed by the EMI system. As the cycle time is reduced, the requirements for warehousing raw materials and lead time for fulfilling product orders can be reduced resulting in a more efficient and profitable manufacturing process.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

A visualization system is communicatively coupled to an industrial control system and configured with a series of display graphics. The graphics are designed to represent the process under control and provide the ability to display current process conditions and download data to the industrial controllers. The visualization system also provides the ability for the engineer to configure data models for collection and automatic transmission to an EMI system. The EMI system then combines the process data with other data collected from other aspects of the manufacturing process and performs an analysis of the process with respect to workflow and maintenance. The generated report is downloaded to the visualization system on a timed schedule for workflow control and on an event schedule for addressing certain critically developing problems relating to maintenance and downtime. The operator, upon receiving a workflow report at the beginning of a shift, day, week or product run can plan his actions accordingly based on more accurate projections of product requirements.

Additionally, the operator can receive notifications of eminent problems such as a low supply of raw materials or a gradual drifting of product quality towards the limits of acceptability before the product reaches a state of rejection. The notifications are prioritized and provided to the appropriate individual based on the skill set required to resolve the problem. For instance, problem notifications can be sent to an operator, an engineer or a person assigned to order raw materials for the manufacturing process or to quality personnel instructing them to run additional analysis.

The automated link to the EMI system also provides for the EMI system to send analyzed process information to other systems for archival purposes. For instance, information can be sent to an audit system to archive all changes made to the process during manufacture for public health requirements. In another example, the EMI system can send generated reports of process data to government agencies to comply with environmental standards and notify operators and engineers of a need to make process adjustments to remain in compliance.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
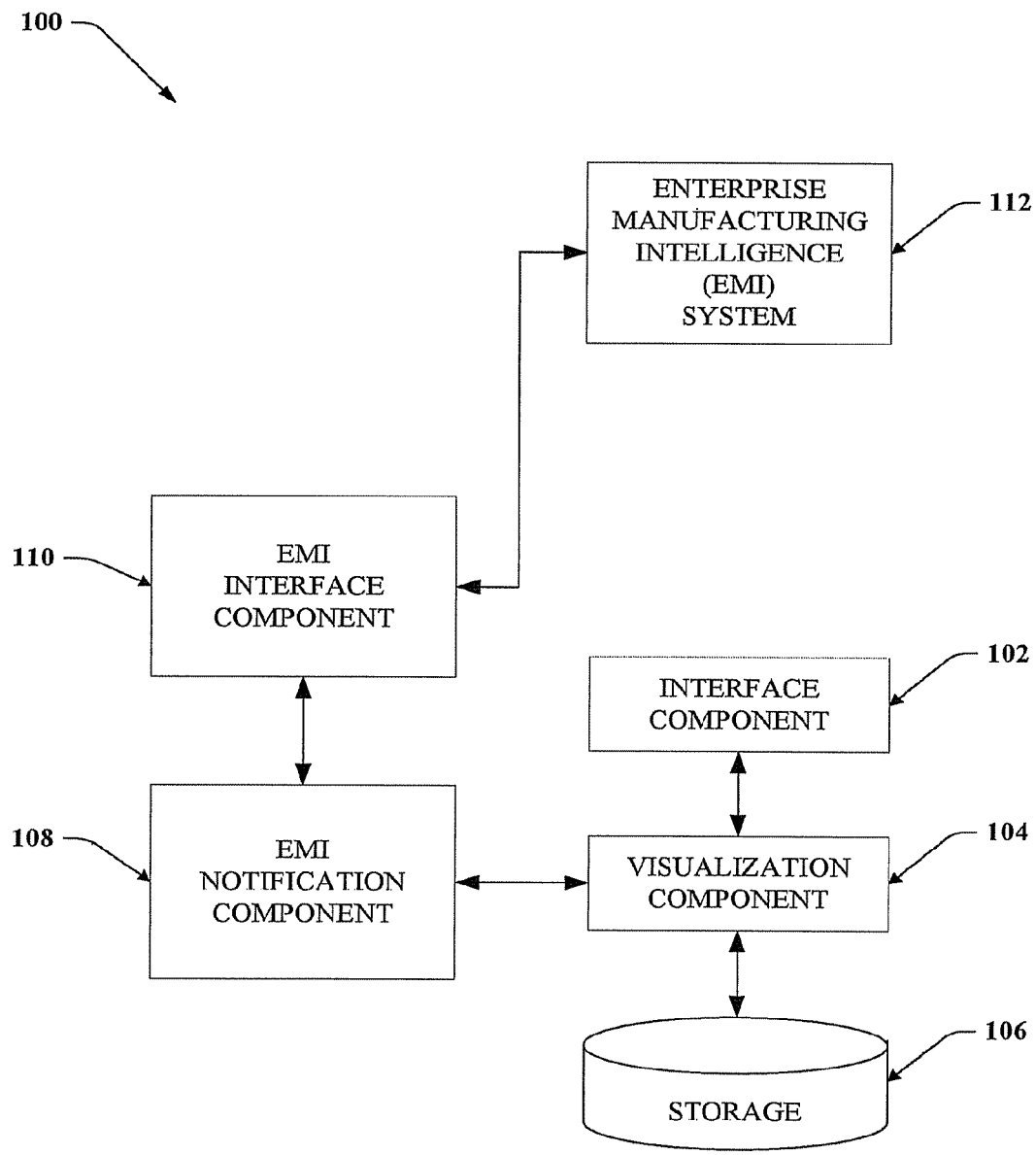
FIG. 1 illustrates an embodiment of a visualization system for interacting with an EMI system to optimize the operation of the controlled process.

Systems and methods are provided enabling the user to configure a visualization system to allow interaction with an Enterprise Manufacturing Intelligence (EMI) System. The interaction allows for the automatic uploading of process data from the industrial controller by way of the visualization system to the EMI system for analysis. The EMI system then automatically downloads reports and directives to the visualization system for invoking actions by the appropriate individual to optimize process operations. The reports include but are not limited to workflow information with respect to type and amount of product desired and raw material availability. The directives include but are not limited to product quality drift corrections and expected eminent process downtime.

In one aspect of the subject disclosure, the workflow reports are delivered on a timed basis for implementation. For example, a daily production schedule can be downloaded for operator implementation. The workflow schedule is based on process data collected from the visualization system and combined with order information and raw material availability. In another aspect of the subject disclosure, as the process changes with the change of product runs, wearing of equipment and differences in raw material suppliers, the visualization system, in concert with the EMI system can detect product quality drift towards unacceptable product and notify the appropriate personnel to take action to prevent product quality failures. In another aspect, the resolution of the detected process problem is fed back to the EMI system as further data to consider in generating workflow reports and maintenance work orders.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a visualization system 100 for interacting with an Enterprise Manufacturing Intelligence (EMI) system 112 is depicted. It should be appreciated that even though an industrial control system controls the process and allows for the archiving of enormous amounts of process data, many of the solutions to process problems are not apparent before they occur without a more detailed scientific analysis or association with other data not available at the visualization system. Visualization system 100 addresses this need by providing a communicative connection to an EMI system 112. The connection allows for the configuration of a model representing the amount, type and frequency of data delivery to the EMI system 112. In turn, the EMI system 112 analyzes the process data combined with data of other parts of the manufacturing facility and generates workflow reports and notifications for investigation of predicted process problems or maintenance work orders. This information is then automatically delivered to the appropriate visualization system for invoking action by the appropriate personnel.

It is contemplated that visualization system 100 can form at least part of a human machine interface (HMI), but is not limited thereto. For example, the visualization system 100 can be employed to facilitate creating a visualization system related to automation control systems, devices, and/or associated equipment (collectively referred to herein as an automation device(s)) forming part of a production environment. Visualization system 100 includes interface component 102, visualization component 104, storage component 106, EMI notification component 108, EMI interface component 110 and a communicative connection to an Enterprise Manufacturing Intelligence system 112.

The interface component 102 is communicatively connected to Input/Output devices. The interface component 102 provides for object or information selection, input can correspond to entry or modification of data. Such input can affect the configuration, graphic display, reports and/or automation devices. For instance, an operator can select the problem solution object to instruct the visualization system 100 to collect and archive process problem solution data. Additionally or alternatively, a user could modify automation device parameters or provide a verbal description of the series of steps the operator used to diagnose the problem. By way of example and not limitation, a conveyor motor speed set point could be increased or decreased and the operator could state that the conveyor was set on a speed inappropriate for the particular product in manufacture. It should be noted that input need not come solely from a user, it can also be provided by automation devices. For example, warnings, alarms, and maintenance schedule information, among other things, can be provided with respect to displayed devices.

The interface component 102 receives input concerning displayed objects and information. Interface component 102 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

The interface component 102 may also receive automated input data from the industrial controller which in turn has received input data from the various devices communicatively connected to the industrial controller. Examples of this input data are temperatures, pressures, flow rates, mass, volume, elapsed time counts and other such information available from an industrial process. The interface component 102 may also transmit modified data to the industrial controller(s) to reflect any changes made by the operator or engineer in implementing the workflow reports or maintenance directives provided by the EMI system 112. For example, if the operator changed the value of a set point for a PID control loop based on a workflow report, the change would be transmitted to the industrial controller implementing this PID control loop. In another example, the interface component 102 can transmit a production report to another operator located at a different visualization system 100 communicatively coupled to the visualization system 100 updating the from the workflow report. This information allows workflow changes to smoothly propagate from one process area to another.

The visualization component 104 presents the configured graphics to the operator for monitoring and controlling the process. One or more of the configured graphics can display the workflow reports or the prioritized list of notifications requiring personnel action. For example, the graphic can have the product type, production amount and projected time or number of shifts for completion. In another example, the operator can review a display of prioritized notifications intended for action by the operator. The operator can proceed to complete the assigned tasks and acknowledge the completion therefore providing the EMI system 112 notice that the action is completed and any associated results.

The visualization component 104 also provides the ability to create the graphic images representing the process, including a framework for the workflow reports and notification displays. The visualization component 104 is communicatively coupled to the EMI notification component 108, allowing the EMI notification component 108 to provide updates to the visualization component 104 based on the operator or engineers interaction with a remote input device.

The storage component 106 provides the ability to archive preconfigured EMI data models, preconfigured visualization systems including displays, reports and recipes and user configured components of the visualization system 100. Additionally, any process problem notification resolutions submitted by the operator or the engineer are logged by the visualization system 100 and archived on the storage component 106 and can be communicated to server data stores 1330 or other visualization system clients 1310.

In another aspect, process data is maintained on the storage component 106 for future review with regards to uploading the data to an EMI system 112. The storage component 106 can automatically transfer its database to other server data stores or visualization system clients based on a timed schedule or an event such as the modification of an EMI data model. For example, if an operator discovers a new parameter associated with a particular process problem and adds the parameter to the EMI data model, the visualization system 100 will automatically update all other visualization systems containing the modified EMI data model. In this manner, the efficiency of the overall operation is improved because any given process problem must be solved only once. If the particular process problem occurs at another location then the operator at that location will be notified by the associated EMI system 112 that operator intervention is required. In another aspect, a trend of process problems and resolution actions performed by operators or engineers is created and highlights possible process design flaws.

The Enterprise Manufacturing Intelligence (EMI) notification component 108 provides methods and functionality for the visualization system 100 to notify the appropriate individual of an identified problem arising or predicted to eminently arise in the manufacturing process. For example, the EMI notification component 108 can send the notification to an operator or an engineer depending on the problem and the corrective action required. In another aspect, the EMI notification component 108 can send notice to the audit system providing for tracking of any changes to the process and data regarding the current raw material usage and production counts. The EMI system 112 can use this provided data to further analyze the process and validate assumptions made in previous analysis before forwarding the information to the EMI notification component 108 for distribution to other visualization systems 100. For instance, the EMI notification component 108 can determine and confirm the percentage of raw material resulting in scrap and send a notice to a duty station responsible for ordering raw materials instructing the order of additional raw material to meet production requirements. In the same regard, the EMI notification component 108 can notify engineering of the actual efficiency of the manufacturing system with regards to raw material utilization and prompt a review of the manufacturing process design.

In another aspect, the operator can perform one or more selections preconfigured on the remote notification device 1002, 1004 to indicate that the operator has completed a process action based on a notification from the EMI system 112. This method results in the same acknowledgement to the EMI notification component 108 described above but does not require the operator to return to the visualization system 100 to activate the operation. This is important in certain circumstances where the operator cannot leave the specific area of the problem before the problem is corrected but desires to inform the EMI system 112 in expectation of another notification in the same process area.

In another aspect, the operator can verbalize both data and commands to a microphone 1102 communicatively coupled to the EMI notification component 108. As with the operator selection described above, the voice activated system allows the operator to notify the EMI notification component 108 without the requirement of returning to the visualization system 100 for user interaction.

The Enterprise Manufacturing Intelligence (EMI) interface component 110 provide the communication interface to the EMI system 112 allowing the visualization system 100 to send process data to the EMI system 112 and allowing the EMI system 112 to send workflow reports and notifications to the visualization system 100. The EMI interface component 110 can send data on a time-based schedule or on an event based schedule. For example, the EMI interface component 110 can be configured to upload the production data for the process at the end of each shift. In turn, the EMI system 112 will analyze the actual production with respect to the requested production for the shift and can then download a modified production workflow report for the next shift based on the differences in the actual versus requested production. In another example, if the visualization system 100 detects process downtime due to some equipment failure, the EMI interface component 110 can immediately notify the EMI system 112 of the condition and the EMI system 112 can shift production of the required product to another production line or facility so committed orders can be fulfilled.

The Enterprise Manufacturing Intelligence (EMI) system 112 is communicatively connected to the visualization system 100 through the EMI interface component 110. The EMI system 112 works collaboratively with the visualization system 100 to optimize the operation of the controlled process by accepting process data from the EMI interface component 110 of the visualization system 100 and providing workflow reports and event notifications to the EMI interface component 110 of the visualization system 100. It should be noted that the EMI system 112 can in fact be a plurality of EMI systems 112 networked together to perform the same or additional functionality with regards to the specific examples elaborated herein.

Figure 2:
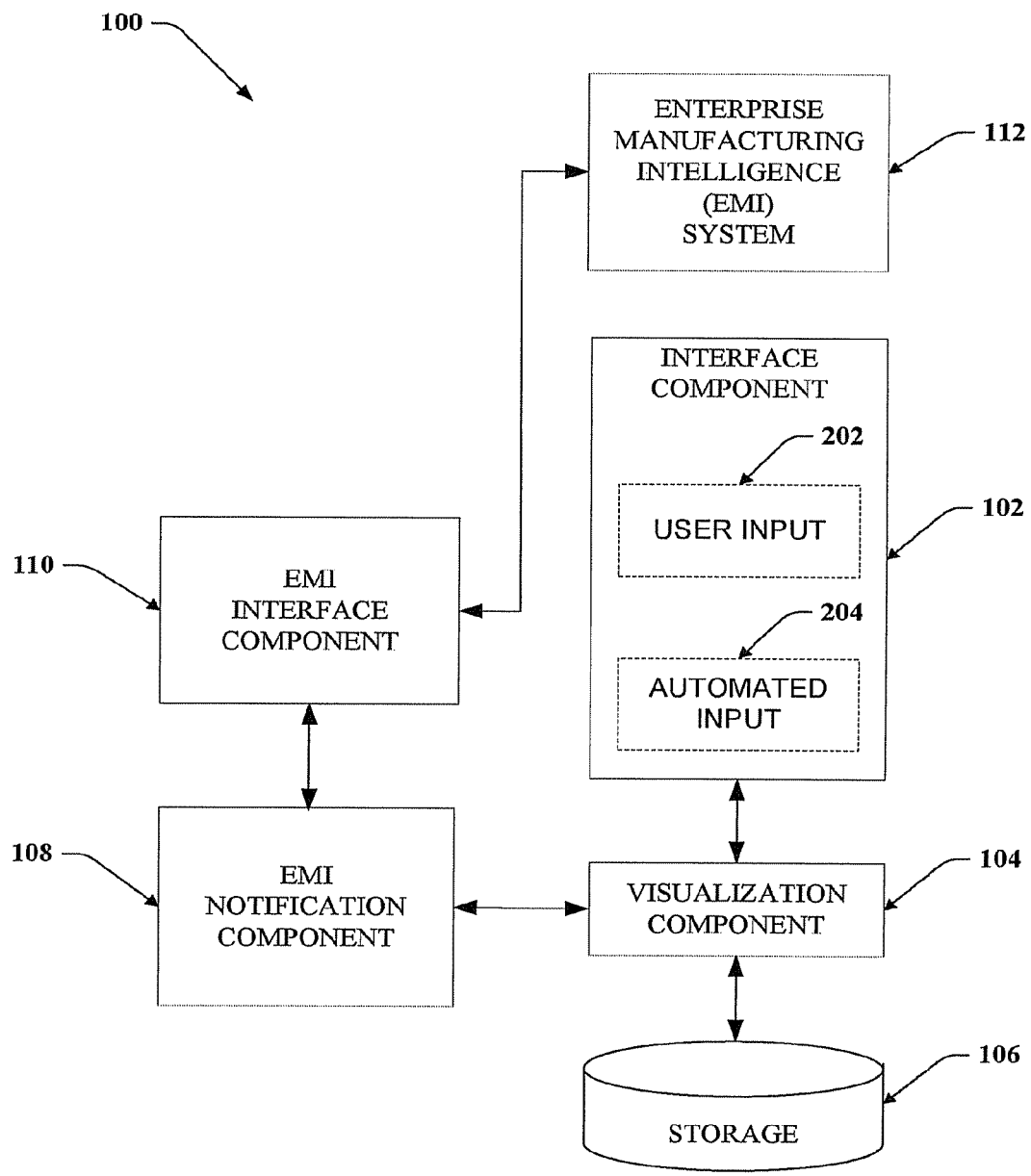
FIG. 2 illustrates an embodiment of a visualization system for interacting with an EMI system to optimize the operation of the controlled process where an interface component allows the collection of automated data and manual data.

Referring next to FIG. 2, the interface component 102 includes user input component 202 and automated input component 204. In one aspect, user input component 202 provides the capability for an operator or an engineer to input manual data related to and describing a solution to a particular process problem. The operator or engineer can add this information either before or after selecting the notification command initiating the feedback communication to the EMI system 112. For example, while the operator was correcting a process problem at a particular machine based on a notification from the EMI notification component 108, a verbal command was sent by the operator to archive the completed correction and to provide the correction data to the EMI system 112. At a later time, when the process is again operating as intended, the operator, using the user input component 202, can add additional information or comments for communication to the EMI system 112 to further describe the corrective action or extend the corrective action to other aspects or machines of the process. The enhanced corrective action description can then be communicated to the EMI system 1112 for distribution to other servers 1330, visualization systems 100, or functional areas of the facility such as production management and quality control to decrease overall production downtime by providing greater insight into success of the corrective action notification.

In another aspect, the automated input component 204 responds to the production data collected by the visualization system 100 by invoking the EMI interface component 110 to transmit the collected process data associated with the previously downloaded workflow report to the EMI system 112 for analysis. For example, if the process production data collected at the end of the shift indicates that a greater amount of product than expected has been manufactured, then the EMI system 112 will generate a new workflow report for the next shift indicating a lower production quota. This automatic feedback mechanism assures that only enough product for fulfilling current orders is manufactured therefore maximizing resource utilization and preventing the requirement of storage for excess product.

Figure 3:
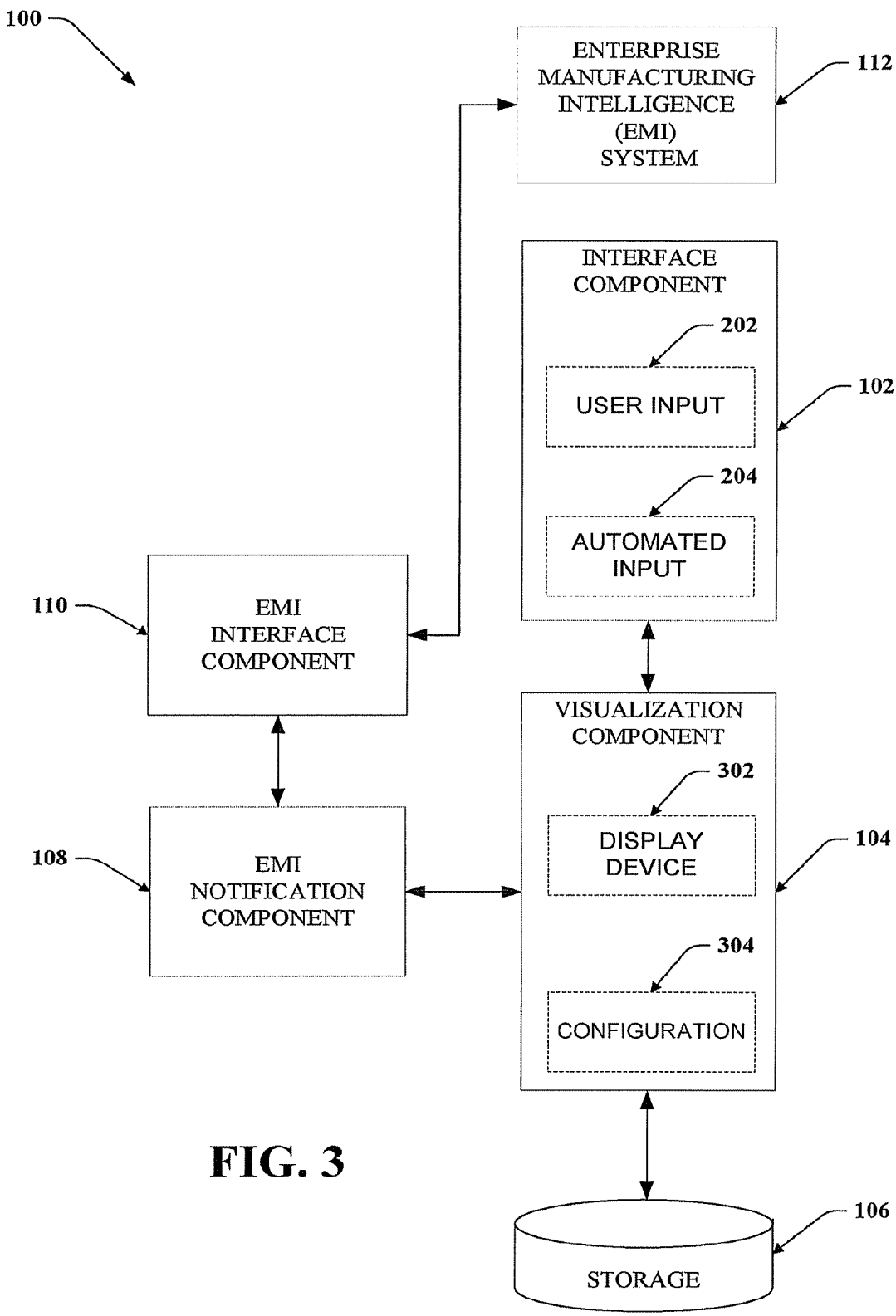
FIG. 3 illustrates an embodiment of a visualization system for interacting with an EMI system to optimize the operation of the controlled process where a visualization component allows the creation, configuration and display of graphic images.

Referring next to FIG. 3, the visualization component 104 includes a display device component 302 and a configuration component 304. In one aspect, the display device component 302 provides a device for rendering a graphic image allowing the operator to monitor the process. A part of the graphic image includes the graphical representation of the workflow report and event notifications for operator interaction. The workflow report is configurable in a format consistent with operator expectations including but not limited to a tabular report and can appear alone on a graphic page or as a window on a page containing other information. For example, the user can configure a button labeled "Workflow" and when the operator clicks on the button, the workflow report page is displayed and provides the operator current data representing projected versus actual production counts.

In another aspect, the visualization component can represent the EMI system 112 notifications as a list of tasks for operator or engineer action. The list can be displayed in a prioritized fashion indicating the order the operator or engineer should perform the tasks and provides a mechanism for acknowledging the completion of the task. For example, the operator can click on the line describing the task invoking the presentation of a button labeled completed. The operator can then select the completed button to indicate to the EMI notification component 108 that the task is completed. It should be noted that many other configurations of notification display and acknowledgment are available based on the visualization system 100 configuration.

In another aspect, the configuration component 304 provides for creating graphical displays representing the process and equipment of interest. A part of creating the graphical display includes creating a schedule for uploading process data from the EMI interface component 110 to the EMI system 112. Configuring the schedule object can include selecting EMI data models for later use by the scheduler. The scheduler, at the predefined time, uploads the process data to the EMI system 112 for analysis. In another aspect, the configuration component 304 provides for predefining events, such as the completion of the specified production, for invoking the EMI interface component 110 to upload production data to the EMI system 112. It should be noted that other events related to uploading and downloading data and information respectively can be configured by the configuration component 304.

Configuration component 304 can also allow the configuration of the collection of specific data as part of the EMI data model. For example, as an operator becomes more familiar with a process and its behavior, specific data can become known as relevant to manufacturing a particular product. The configuration component 304 provides the ability to define the specific data to collect when the visualization system 100 activates the particular EMI data model. In another aspect, the configuration component 304 can provide for the operator or engineer to modify the collection strategy at the time the correction notification is received or performed. For example, in correcting a particular problem on a new piece of equipment based on an EMI notification, the operator may learn that a different data set is more relevant to the correction and select a different EMI data model or modify the data collection strategy of the currently selected EMI data model.

Figure 4:
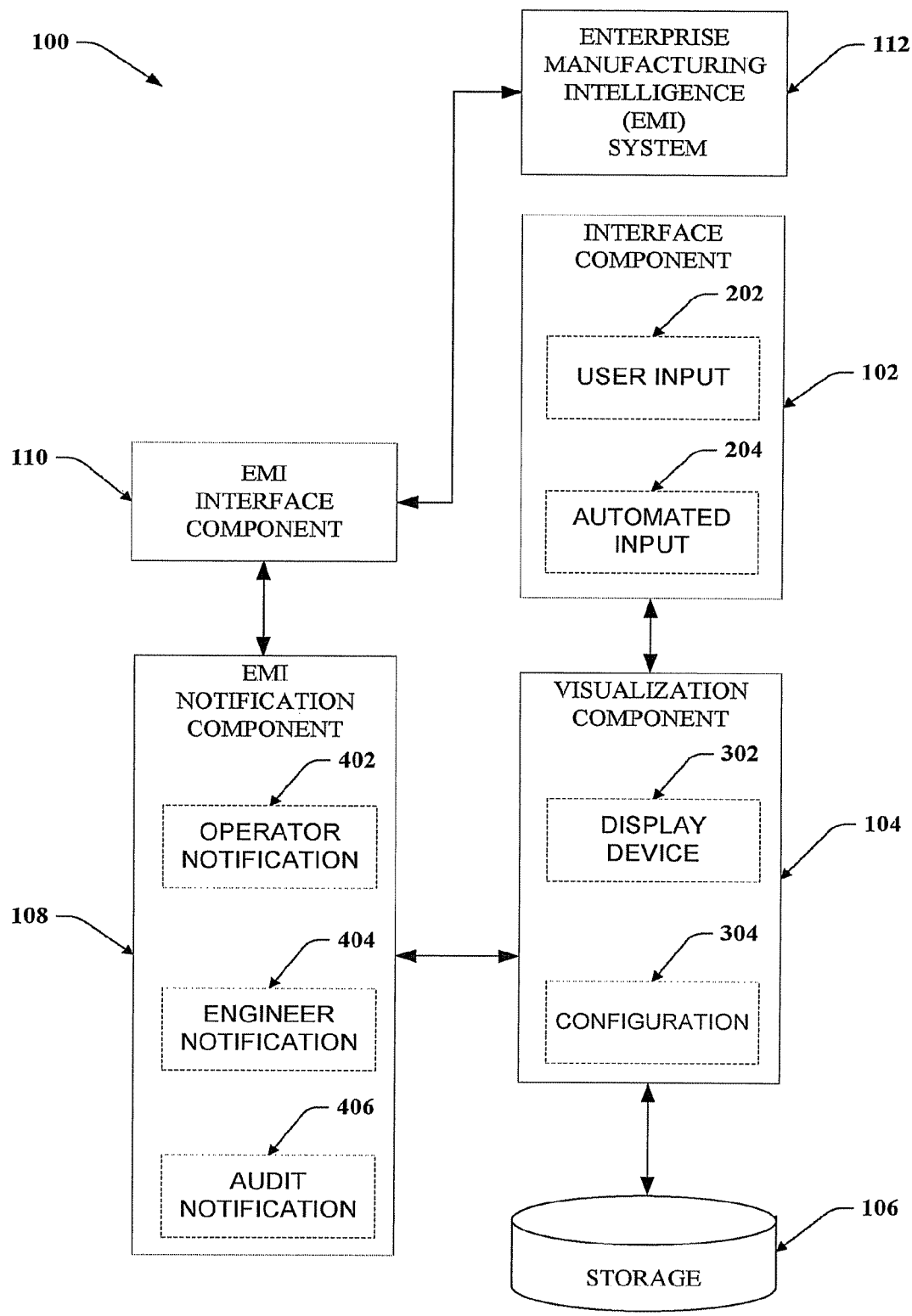
FIG. 4 illustrates an embodiment of a visualization system for interacting with an EMI system to optimize the operation of the controlled process where an EMI notification component allows an operator, engineer or auditing entity to be notified of process activity.

Referring to FIG. 4, the Enterprise Manufacturing Intelligence (EMI) notification component 108 includes operator notification component 402, engineer notification component 404 and audit notification component 406. In one aspect, the operator notification component 402 allows the visualization system 100 to alert the operator to notifications from the EMI system 112 requiring operator actions. In one embodiment, the operator wears an earpiece and a microphone connected to a transmitter. A receiver compatible with the transmitter is connected to the visualization system 100 allowing the operator to move about the manufacturing area to take the corrective actions requested by the EMI system 112 and provide feedback acknowledging the completion of the requested action. For example, if the operator receives a notice that product quality is drifting towards an unacceptable limit because of excessive line speed, the operator can reduce the line speed to the recommended level and acknowledge the completion of the task to the EMI notification component.

In another aspect, microphones and headsets can be place in strategic locations around the process area and wired directly to the visualization system 100 providing a more reliable communication mechanism in an electrically noisy environment. In this implementation, the operator would report to the most convenient microphone/headset location and communicate similar data and commands to update the EMI notification component 108.

The voice interactive system provides the specific benefits of allowing the operator to receive notifications from the EMI system 112 and invoke commands to the EMI notification component 108 while taking the recommended corrective action and monitoring the result of the action. During this action, the operator remains hands free and focused on the primary task of maintaining process operation while reducing the risk that the product will invade an area of unacceptable product quality or valuable process data will be lost as a result of being deferred until the corrective action is completed.

In another aspect, the operator notification component can interact with the display device 302 of the visualization component 104 and present a window, similar to an alarm window, of the arrival a new notification from the EMI system 112. The operator upon reviewing the notification can take the requested corrective action and select the appropriate graphical object to indicate that the corrective action is complete. It should be noted that a recommended corrective action may not always be part of a notification, unknown product problems may require investigation by the operator before a corrective action can be recommended.

In another aspect of the operator notification component 402, the operator can receive an initial or updated workflow report based on new production information provided by the visualization system 100. The operator can review the new workflow report and adjust the product production schedule accordingly. For example, a product run that was scheduled to end at the midpoint of the operators' shift may be required to continue until the end of the operators' shift because another line contributing to the required production amount is down and not expected to return to production before the end of the current shift.

The engineer notification component 404, in another aspect of the subject invention, provides similar capability as the operator notification component 402 but is delivered in different fashions and invokes different actions. For example, the engineer notification component 404 can send the engineer an email describing a suspected systemic problem or quality problem. The suspected systemic problem may require the engineer to reevaluate the design of the production line, an issue the operator cannot address. The quality problem may require the engineer to contact the vendor of a raw material for resolution, again a problem an operator cannot correct at the production line.

In another aspect of engineer notification component 404, the EMI notification component 108 can provide an industrial engineer time study information related to the efficient operation of the production line. The industrial engineer can evaluate the report and decide if a time study is necessary to determine a more efficient method of operating the production line. In another aspect of engineer notification component 404, a critical process downtime event may result in the required presence of the engineer at a time when the engineer is not at the manufacturing facility. The EMI notification component can dial a pager or a cell phone number configured for the engineer and deliver a preconfigured message instructing the engineer to return to the manufacturing facility to assist in a critical problem.

The audit notification component 406, in another aspect, provides the ability to include any data available to the visualization system from the industrial controller in data archiving for maintaining an audit trail of production information and any corrections performed by the operator or the engineer. Notifications sent to either the operator by the operator notification component 402 or the engineer by the engineer notification component 404 is duplicated to the audit notification component 406. The audit notification component 406 uploads the information to the EMI system 112 through the EMI interface component 110 and archives the information to the storage component 106 for redundancy.

In another aspect, the audit component 406 also provides the production information and the record of the raw materials used in the manufacturing of specific products to the EMI system 112. This information is also archived to the storage component 106 for redundancy. For example, in a food product manufacturing operation, the origin, identity and delivery of all components included in the product are included in the audit report so each component can be back tracked should any consumer complaints arise after the product is made available to the public.

Figure 5:
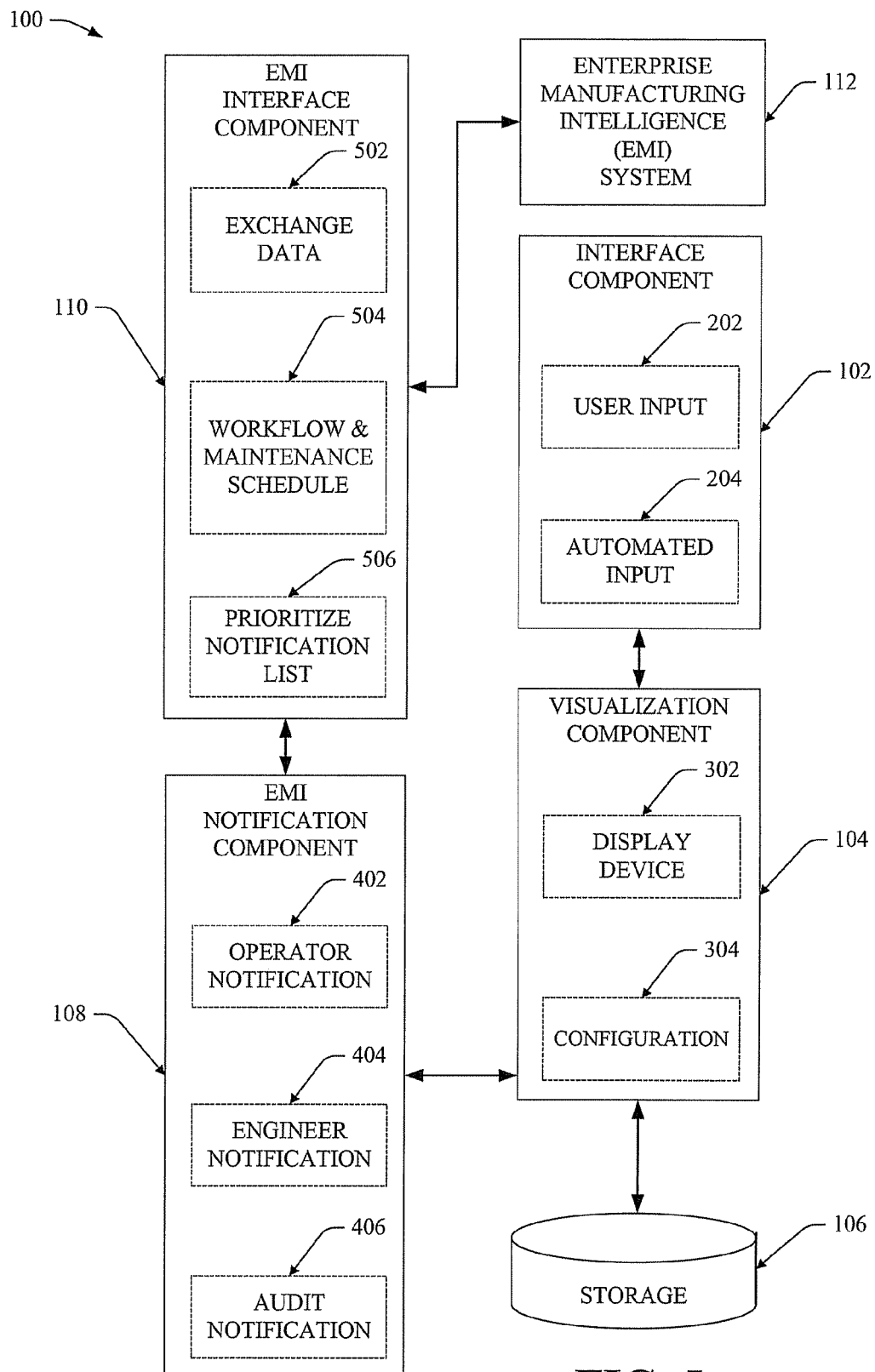
FIG. 5 illustrates an embodiment of a visualization system for interacting with an EMI system to optimize the operation of the controlled process where an EMI interface component allows the automated transmission of process data to an EMI system and the receipt of workflow schedules, maintenance schedules and prioritized event notification lists.

Referring now to FIG. 5, the Enterprise Manufacturing Intelligence component 110 includes an exchange data component 502, a workflow and maintenance schedule component 504 and a prioritize notification component 506. In one aspect, the exchange data component 502 allows for process data collected from the industrial controllers, operators and engineers to migrate to the EMI system 112 for combination with other facility data and subsequent analysis. The exchange data component 502 can transmit this data based on a predefined schedule, based on the occurrence of a predefined event or based on a manual initiation by the operator, the engineer or other authorized personnel. Authorization requires the presentation of appropriate security credentials to the visualization system 100.

In another aspect, the exchange data component 502 allows for workflow reports and event notifications generated by the EMI system 112 to be downloaded to the EMI interface component 110. The EMI interface component 110 can immediately direct the notifications to the notification display screen and/or to the remote notification device worn by the operator or engineer as configured for the visualization system 100. The EMI interface component 110 can incorporate an updated workflow report into the graphic screen displaying the current workflow plan. It should be noted that data exchange between the visualization system 100 by way of the EMI interface component 110 and the EMI system 112 can occur manually, automatically based on configuration or any combination of thereof.

In another aspect of the subject invention, the workflow and maintenance schedule component 504 provides a mechanism for the operator to manage and report the production of the associated process line and any corrective or scheduled maintenance activities occurring on the line during the production cycle. For example, the operator can inspect the workflow report at the beginning of the shift to verify the type and amount of product to manufacture. During the shift the operator can update through the workflow report the progress in terms of the amount of product currently manufactured or input manual quality data associated with the product. The operator can also receive updated workflow reports instructing for a different amount based on a change in orders received by the EMI system 112.

In a specific example, the operator can receive a rush order workflow report requiring the change in product manufacture to satisfy a rush order commanding a premium price. The rush order must be shipped before the current product under manufacture is complete so an immediate changeover is required to satisfy the order. The production schedule remains dynamically alterable based on data unavailable to the operator such as order priority and raw material availability.

In another aspect, the prioritize notification list component 506 provides a mechanism for confirming that the operator corrects process problems in the proper order. For example, a series of quality problems may emerge in the view of the EMI system 112. In response, the EMI system 112 downloads notifications to the EMI interface component 110 to the visualization system 100. The prioritize notification list component 506, through intimate knowledge of the process and the operator location, can prioritize the list so the operator takes corrective action in the proper order.

In one example, the prioritize notification list component 506 observes by way of the operators position locating device that the operator is located in an area of the manufacturing facility where corrective action is required and does not depend on other corrective action occurring first. Accordingly, the operator is notified to take the corrective action located in his vicinity. The operators' efficiency is therefore increased by reducing the operators' travel time around the manufacturing facility. In another example, the collection of notifications presents a scenario where the corrective action must be taken in a particular order regardless of the location of the operator. In these circumstances, the operator is directed to take the corrective actions in the order required by the process. Upon completing each corrective action, the operator responds to the EMI notification component 108 with an acknowledgement and receives the next corrective action notification. The operator can use the remote notification device or can enter the acknowledgement at the visualization system 100. It should be noted that the acknowledgement on the graphic display can be invoked by other input devices such as a trackball, keyboard, keypad, light pen, stylus, etc.

Figure 6:
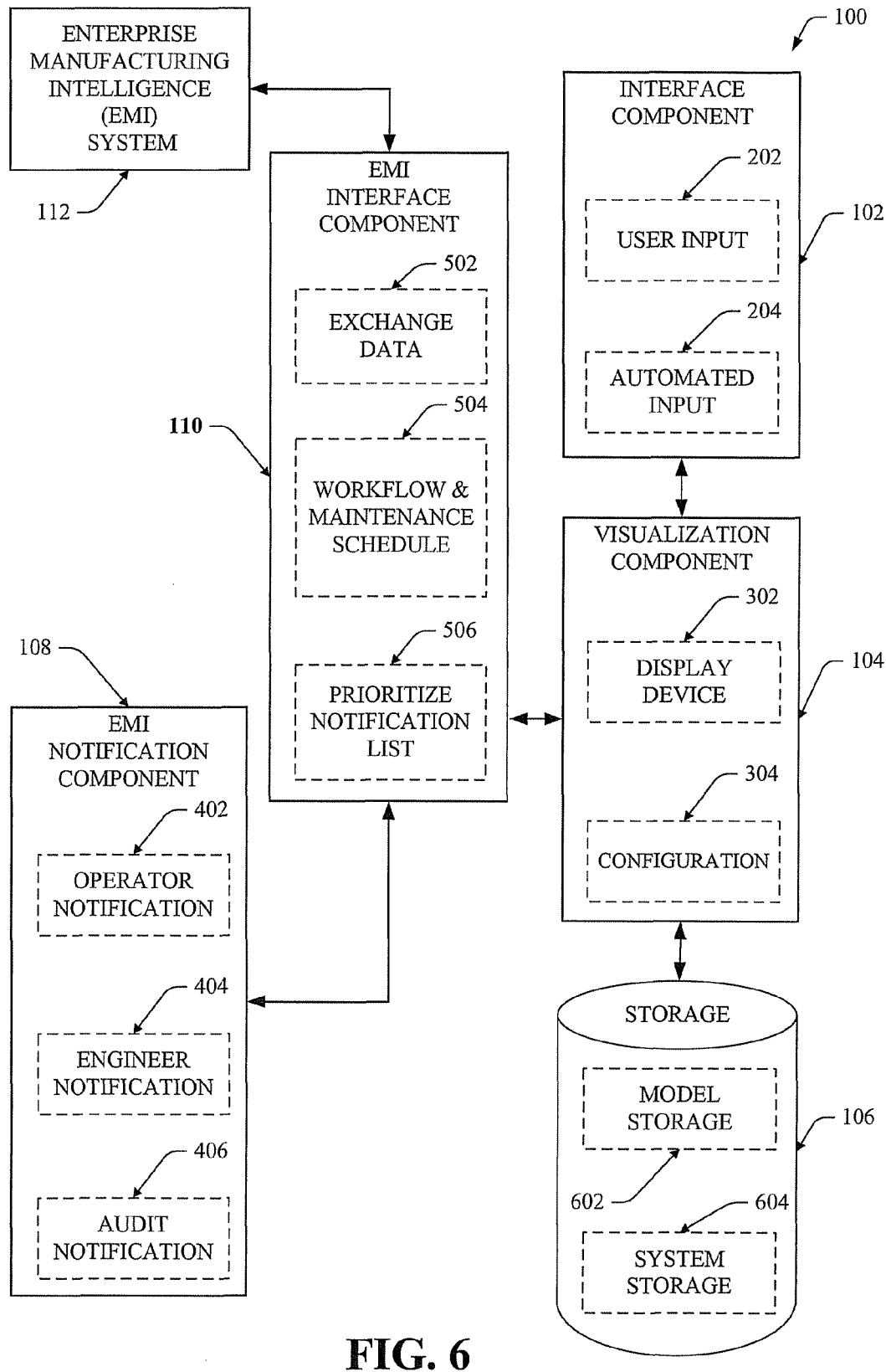
FIG. 6 illustrates an embodiment of a visualization system for interacting with an EMI system to optimize the operation of the controlled process where a storage component allows the visualization system to store workflow and maintenance schedules and event notification lists.

Referring now to FIG. 6, the storage component 106 includes a model storage component 602 and a system storage component 604. Storage component 106 can be any suitable data storage device (e.g., random access memory, read only memory, hard disk, flash memory, optical memory), relational database, XML, media, system, or combination thereof. The storage component 106 can store information, programs, historical process data and the like in connection with the visualization system 100. In one aspect, the model storage component provides the capability to store a plurality of preconfigured EMI data models. The preconfigured EMI data models can be organized by any criteria and made available for selection by the operator. For example, the operator can choose a preconfigured EMI data model based on the production line type or on a particular machine operating as part of the production line.

At the operators' discretion, new models can be created and stored based on changes to the production line or a particular machine. The operator can also combine multiple models to create a new larger data view model. For example, the operator can select a bottle filler machine, a bottle capper machine and a bottle labeler machine to create a bottling line preconfigured EMI data model. The operator can then exclude the detailed information about each machine and include more general information related to the overall production line. When the operator invokes the data exchange of this new model, the newly configured EMI data model process data is collected for transmission to the EMI system 112. The model storage component 602 also allows the preconfigured EMI data models to be shared with server data stores 1330 or other visualization systems 100 through any of the communicatively connected systems.

In another aspect, the system storage component 604 provides storage for all the components required to operate the visualization system 100 and the process data collected based on operator invocation of the EMI data model. As with the preconfigured EMI data models, the collected process data can be shared among server data stores 1330 or other visualization systems 100. A data archive system associated with the system storage component 604 provides for automatically backing up changed preconfigured EMI data models and process data based on a timed frequency and an indication that the system storage component 604 is reaching full capacity.

Figure 7:
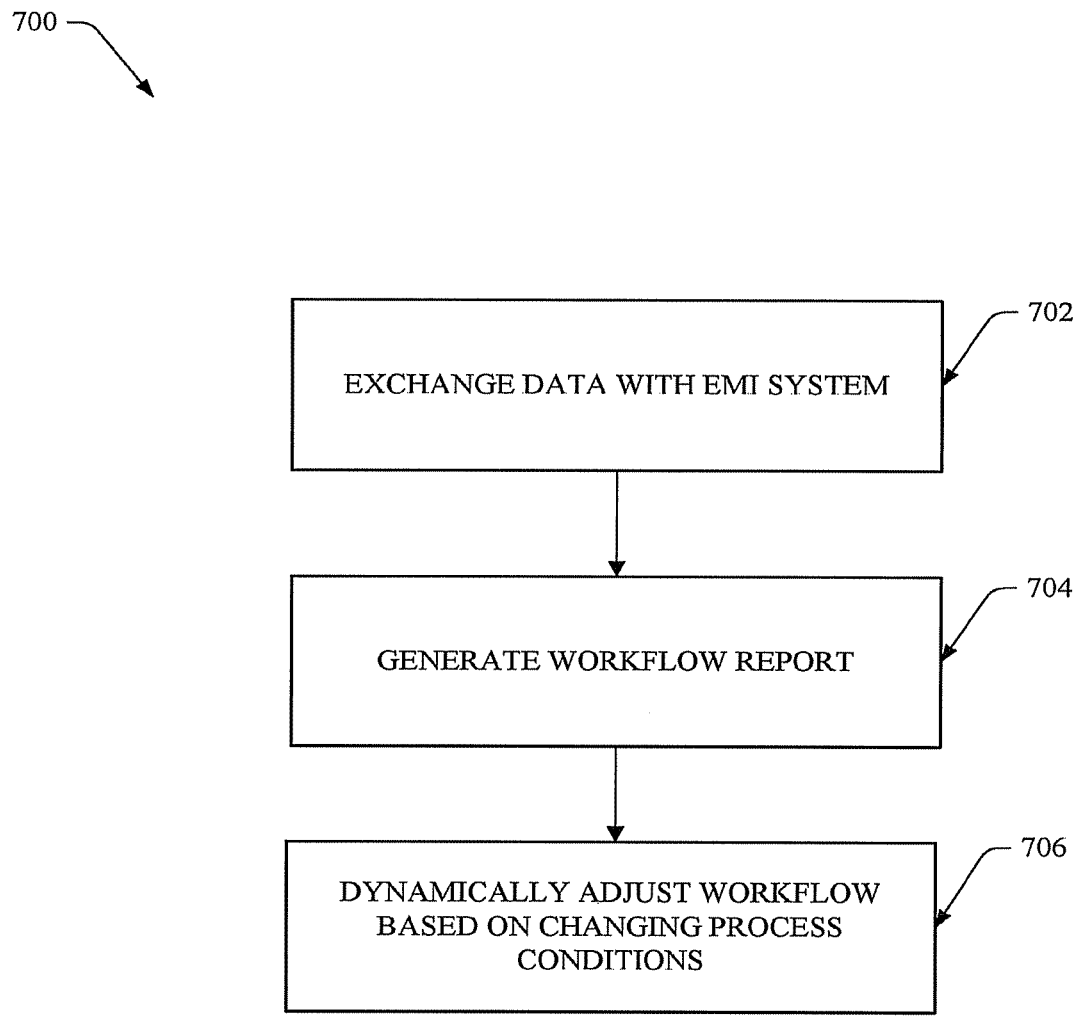
FIG. 7 illustrates a methodology of a visualization system where the system exchanges data and information with an EMI system, generates a workflow report and updates the workflow report based on changing process conditions.

Referring now to FIG. 7, a method 700 of maintaining a dynamic workflow report is illustrated. In one aspect at 702, production data from the visualization system 100 is uploaded to the EMI system 112 for combination with other manufacturing data and workflow analysis. In another aspect, but at the same time, newly generated workflow reports are downloaded from the EMI system 112 to the visualization system 100 by way of the EMI interface component 110. The data exchange between the visualization system 100 and the EMI system 112 provides for a feedback loop to keep current information necessary for manufacturing but unavailable to the operator through the industrial controller visible to the operator during the manufacturing process.

In another aspect at 704 of the method 700 of maintaining a dynamic workflow report, a workflow report is generated to begin the manufacturing cycle. Process data collected from the last production cycle and information from other areas of the facility such as raw materials and sales are included to assure sufficient raw materials are available and to manufacture sufficient product to satisfy currently outstanding orders. After the workflow report is generated it is presented to the operator and the engineer as instructions for when to begin the specific product manufacturing, what characteristics to include and how much product to make.

In another aspect at 706 of the method 700 of maintaining a dynamic workflow report, process data provided by the operator, engineer or other sources such as sales or raw materials are reevaluated in light of the existing workflow report. In some circumstances changes from any of these data sources can lead to a need to update the workflow report for implementation by the operator. For example, if another line assisting in the manufacture of the current product has an equipment failure resulting in significant downtime, then the workflow report for the remaining manufacturing lines must be updated with additional manufacturing quantity requirements. This mechanism allows for covering the lost production without losing time in line reconfiguration because the operator was unaware that additional production was required. In another example, a shortage of raw materials is discovered before the production lines requiring the raw materials are shutdown because of the insufficiency. An orderly changeover to a secondary product is allowed because of the updated workflow report.

Figure 8:
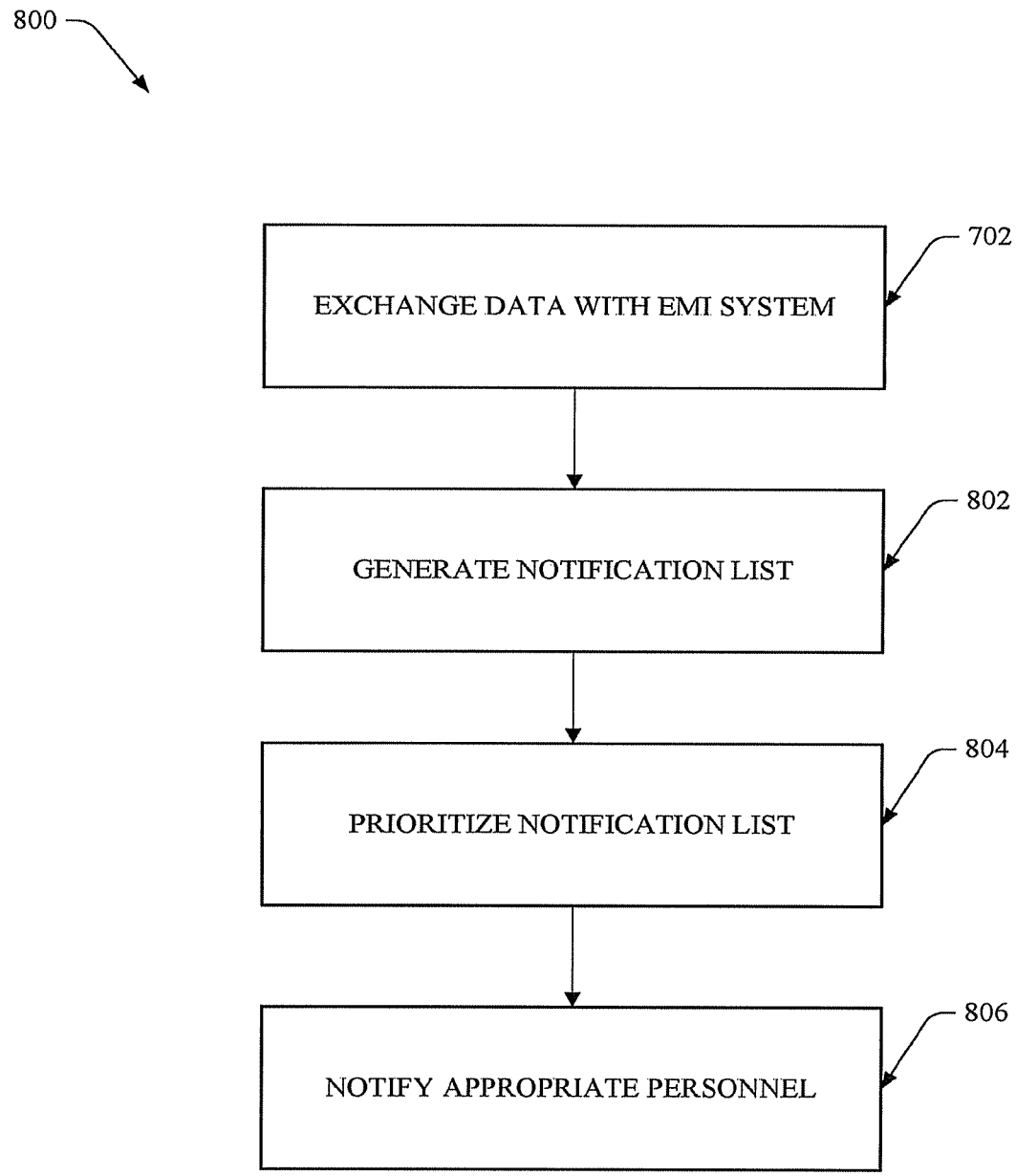
FIG. 8 illustrates a methodology of a visualization system where the system exchanges data and information with an EMI system, generates a notification list, prioritizes the notification list and notifies the appropriate personnel.

Referring now to FIG. 8, a method 800 is illustrated for notifying the appropriate personnel of production problems requiring corrective action. In one aspect at 802, a list of production problems requiring corrective action notification is generated based on data collected by the EMI system 112.

The list of notifications can include destinations of operators, engineers, other facility locations or an audit system.

In another aspect at 804, notification list is prioritized based on different criteria. The criteria can include operator or engineer location, criticality of the notification and corrective action or resolution order requirements based on the corrective action. The priorities are intended to reflect the most efficient order for resolving all of the problems. For example, the EMI interface component 110 may prioritize the notification list based on its knowledge that the hopper jam must be cleared before the line can be restarted. In another example, the EMI interface component 110 may prioritize the notification list based on its knowledge that the operator is in close proximity to one of the problems requiring corrective action even though that particular problem would not normally be the first problem requiring resolution.

In another aspect at 806, the appropriate personnel are notified of the requirement of corrective action. In the case of process downtime problems, the operator is typically the appropriate individual to notify. In the case of problems identified of a systemic nature, or problems related to general efficiency based on operating procedures, the engineer is typically the appropriate individual to notify. In the case of low raw material indications, other facility personnel task with the order and supply of raw materials are the appropriate individuals to notify. It should be noted that a plurality of the above referenced individuals can be notified simultaneously. In all cases, the audit system is notified of any and all changes associated with the product manufacturing.

Figure 9:
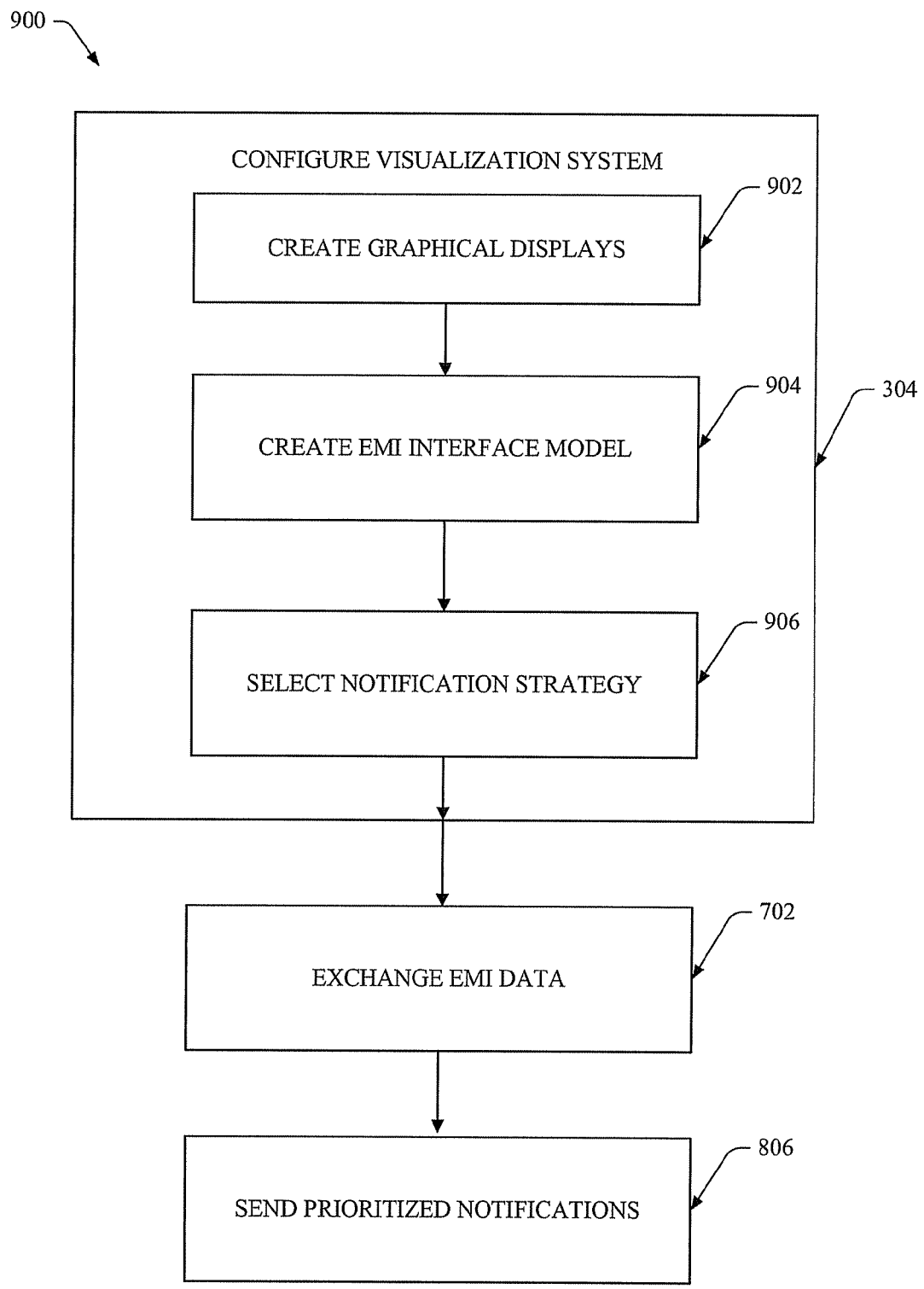
FIG. 9 illustrates a methodology of a visualization system where the user creates the graphic displays, including the EMI exchange model and notification strategy.

Referring now to FIG. 9, a method 900 illustrates configuring a visualization system 100 for interfacing with an EMI system 112. Graphical displays representing the process and the component operations to the desired level of detail are created at 902. In another aspect, the EMI interface data model is created at 904 and added to any or all of the graphical displays, depending on the preferences of the operator, engineer or local convention. The EMI interface data model can contain one or more of the activation mechanisms previously described for method 800 and access security credentials may be required to invoke the EMI interface data model depending on the configuration provided. The security credentials can be required for one activation method and not required for another. For example, security credentials may not be required to invoke the EMI interface data model at the visualization system 100 because the visualization system 100 is located in a secure control room but may be required for voice activation because the voice activation system is located away from the control room and may be implemented with a wireless system that could receive transmissions from outside of the process area.

In another aspect of the subject invention, a preconfigured notification strategy can be selected at 906 as a basis for operator and engineer notification. The model can represent all operators and engineers, a particular operator or engineer or a subset of operators or engineers. The scope of the strategy can vary based on the particular EMI interface data model selected.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 10:
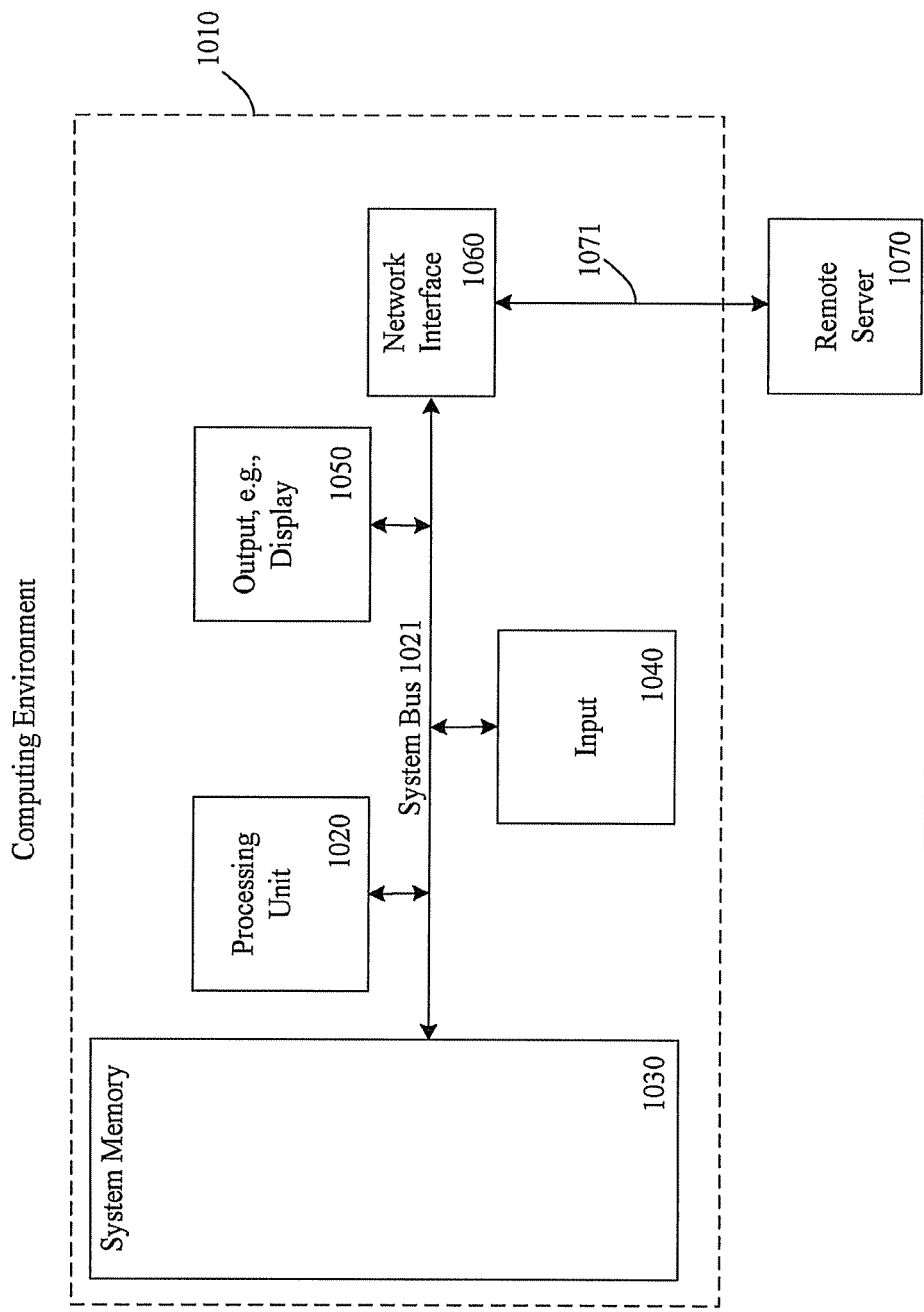
FIG. 10 illustrates an embodiment of the visualization system depicting a typical computing environment.

FIG. 10 thus illustrates an example of a suitable computing system environment 1000 in which the claimed subject matter may be implemented, although as made clear above, the computing system environment 1000 is only one example of a suitable computing environment for a mobile device and is not intended to suggest any limitation as to the scope of use or functionality of the claimed subject matter. Further, the computing environment 1000 is not intended to suggest any dependency or requirement relating to the claimed subject matter and any one or combination of components illustrated in the example operating environment 1000.

With reference to FIG. 10, an example of a remote device for implementing various aspects described herein includes a general purpose computing device in the form of a computer 1010. Components of computer 1010 can include, but are not limited to, a processing unit 1020, a system memory 1030, and a system bus 1021 that couples various system components including the system memory to the processing unit 1020. The system bus 1021 can be any of several types of bus structures including a memory bus or memory controller, a peripheral bus, and a local bus using any of a variety of bus architectures.

Computer 1010 can include a variety of computer readable media. Computer readable media can be any available media that can be accessed by computer 1010. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media can embody computer readable instructions, data structures, program modules or other data in a modulated data signal such as a carrier wave or other transport mechanism and can include any suitable information delivery media.

The system memory 1030 can include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, can be stored in memory 1030. Memory 1030 can also contain data and/or program modules that are immediately accessible to and/or presently being operated on by processing unit 1020. By way of non-limiting example, memory 1030 can also include an operating system, application programs, other program modules, and program data.

The computer 1010 can also include other removable/non-removable, volatile/nonvolatile computer storage media. For example, computer 1010 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1021 through a non-removable memory interface such as an interface, and a magnetic disk drive or optical disk drive can be connected to the system bus 1021 by a removable memory interface, such as an interface.

A user can enter commands and information into the computer 1010 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1020 through user input 1040 and associated interface(s) that are coupled to the system bus 1021, but can be connected by other interface and bus structures, such as a parallel port, game port or a universal serial bus (USB). A graphics subsystem can also be connected to the system bus 1021. In addition, a monitor or other type of display device can be connected to the system bus 1021 via an interface, such as output interface 1050, which can in turn communicate with video memory. In addition to a monitor, computers can also include other peripheral output devices, such as speakers and/or a printer, which can also be connected through output interface 1050.

The computer 1010 can operate in a networked or distributed environment using logical connections to one or more other remote computers, such as remote server 1070, which can in turn have media capabilities different from device 1010. The remote server 1070 can be a personal computer, a server, a router, a network PC, a peer device or other common network node, and/or any other remote media consumption or transmission device, and can include any or all of the elements described above relative to the computer 1010. The logical connections depicted in FIG. 10 include a network 1071, such local area network (LAN) or a wide area network (WAN), but can also include other networks/buses. Such networking environments are commonplace in homes, offices, enterprise-wide computer networks, intranets and the Internet.

When used in a LAN networking environment, the computer 1010 is connected to the LAN 1071 through a network interface or adapter. When used in a WAN networking environment, the computer 1010 can include a communications component, such as a modem, or other means for establishing communications over the WAN, such as the Internet. A communications component, such as a modem, which can be internal or external, can be connected to the system bus 1021 via the user input interface at input 1040 and/or other appropriate mechanism. In a networked environment, program modules depicted relative to the computer 1010, or portions thereof, can be stored in a remote memory storage device. It should be appreciated that the network connections shown and described are exemplary and other means of establishing a communications link between the computers can be used.

Figure 11:
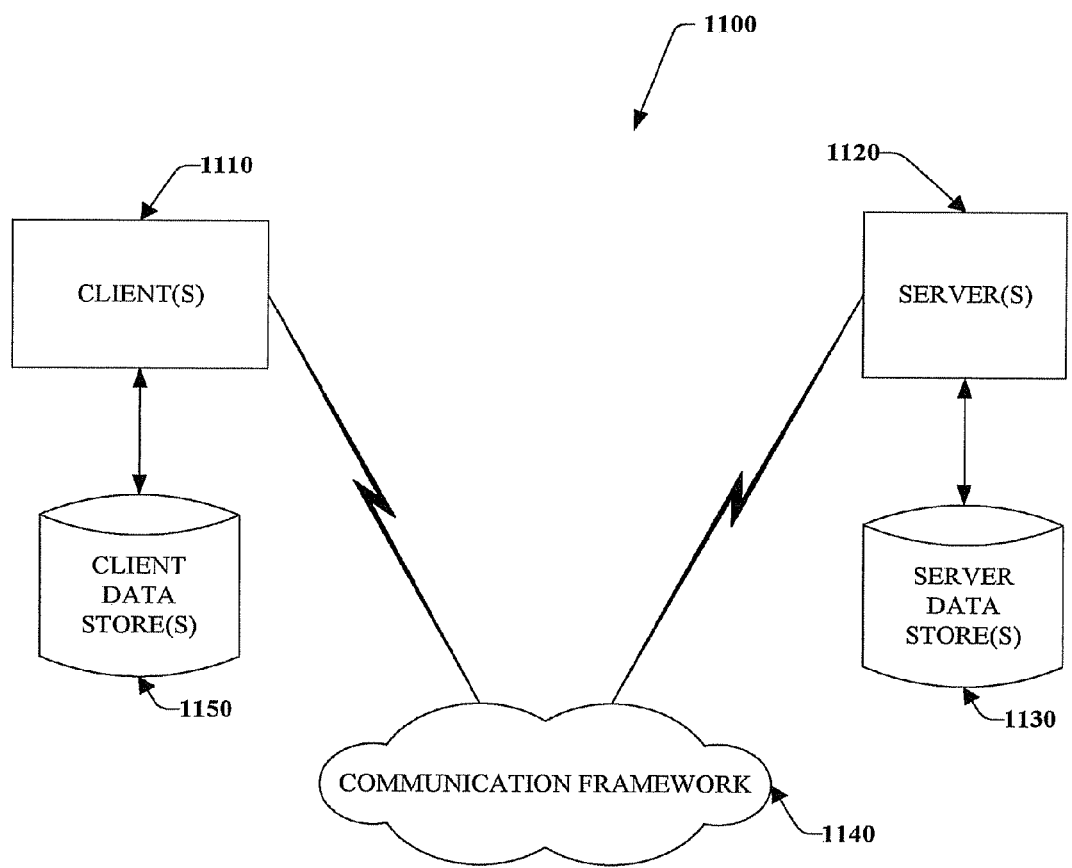
FIG. 11 illustrates an embodiment of the visualization system depicting the interaction between a visualization client and a visualization server.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example.

Specifically, one component that can be implemented on the server 1120 is a security server. Additionally, various other disclosed and discussed components can be implemented on the server 1120.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

Figure 12:
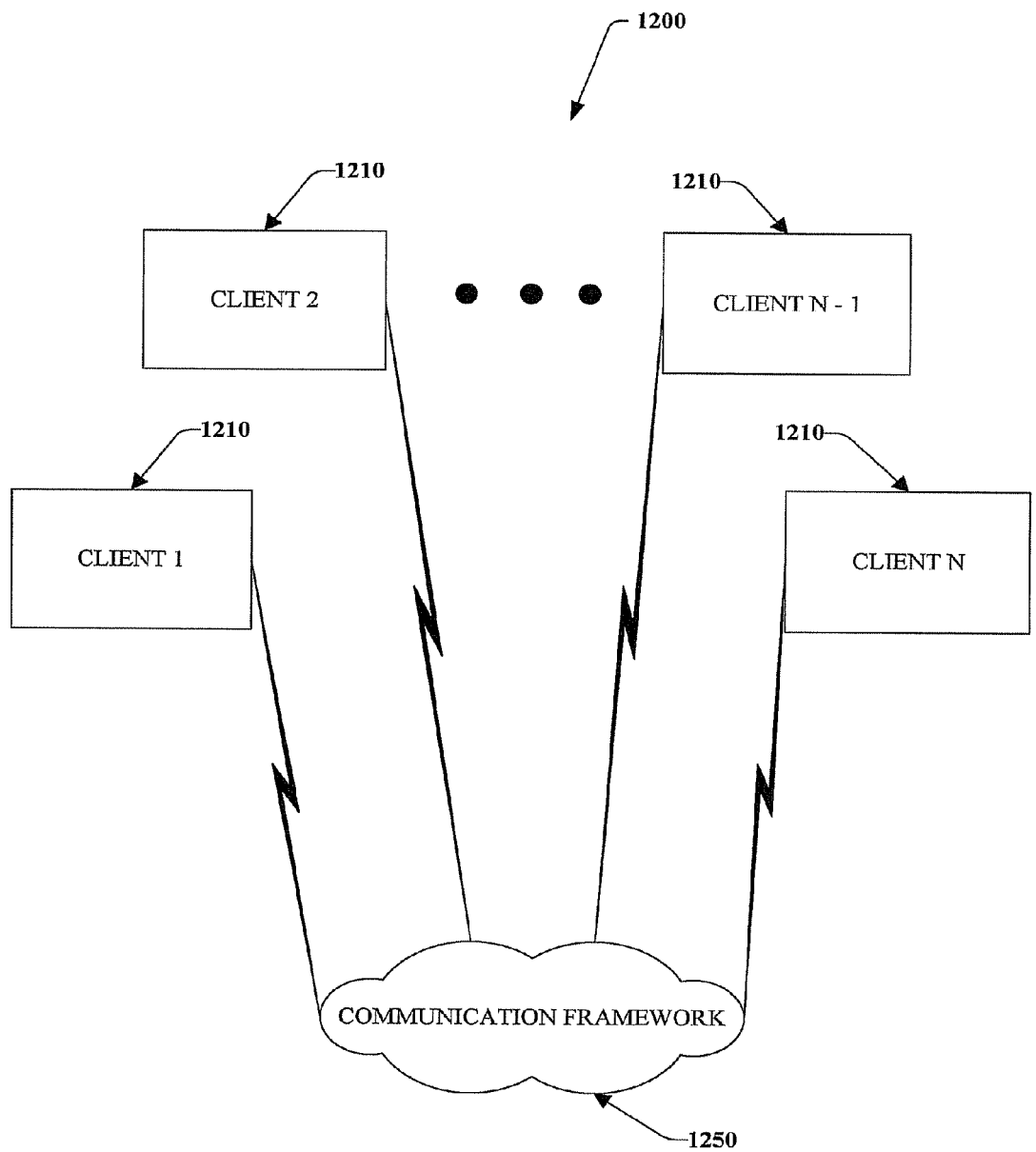
FIG. 12 illustrates an embodiment of the visualization system depicting the interaction between multiple visualization clients.

Referring again to the drawings, FIG. 12 illustrates an embodiment of the subject invention where a plurality of client systems 1210 can operate collaboratively based on their communicative connection. For instance, as described previously, a visualization system 100 can transmit an updated preconfigured EMI interface data model to a plurality of visualization systems 100 to share the data collection strategy with other production lines manufacturing the same or similar products. In another example, the visualization systems 100 can operate in a series fashion, allowing an operators' communication received by visualization system client 1 to transmit the information to visualization system 100 client 2 which proceeds to transfer the information to visualization system 100 client N−1 and in a similar fashion transmits the information to visualization system 100 client N where the information is transmitted to a server 1120.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. An industrial automation system, comprising:
a processor; and
a memory communicatively coupled to the processor, the memory having stored therein computer-executable instructions, comprising:
   a configuration component configured to configure a data model for at least one of collection or transmission of data relating to an industrial automation process;
   a storage component configured to retain the data model and further configured to transfer a data log to at least one of a server data store or a visualization system client in response to a modification of the data model;
   an interface component configured to provide the data associated with the industrial automation process to an enterprise manufacturing intelligence system; and
   a visualization component configured to generate a graphical representation indicative of analysis results received from the enterprise manufacturing intelligence system based upon the data associated with the industrial automation process, wherein the graphical representation comprises a list of tasks in the analysis results prioritized based upon a most efficient order in which the tasks are to be performed to resolve one or more problems associated with the industrial automation process.

2. The industrial automation system of claim 1, wherein the graphical representation is further indicative of a set of event notifications received from an enterprise manufacturing intelligence system.

3. The industrial automation system of claim 2, wherein the visualization component is further configured to send respective tasks to corresponding operators skilled in performing the task.

4. The industrial automation system of claim 2, wherein the visualization component is further configured to receive an acknowledgement indicative of completion of at least a subset of the tasks.

5. The industrial automation system of claim 1, wherein the visualization component is further configured to configure a graphical display that represents an industrial equipment associated with the industrial automation process.

6. The industrial automation system of claim 1, wherein the visualization component is further configured to update a disparate visualization component that employs the data model, in response to a modification to the data model.

7. The industrial automation system of claim 1, wherein the analysis results includes at least one of workflow information, maintenance information, a task, an alarm, a report, or a directive.

8. A method, comprising:
configuring, by a system including a processor, a data model for at least one of collection or transmission of data relating to an industrial process;
retaining, by the system, the data model;
transferring, by the system, a data log to at least one of a server data store or a visualization system client in response to a modification of the data model;
providing, by a system the data from the industrial process to an enterprise manufacturing intelligence system;
receiving, by the system, analysis results from the enterprise manufacturing intelligence system based upon the data; and
creating, by the system, a visualization based on the analysis results comprising a list of corrective actions prioritized based upon an optimized order in which the corrective actions are to be performed to resolve one or more problems associated with the industrial process.

9. The method of claim 8, further comprising, transmitting, by the system, the visualization to a display device.

10. The method of claim 8, wherein the receiving includes obtaining an event notification invoking a corrective action.

11. The method of claim 8, further comprising sending, by the system, respective corrective actions to corresponding operators skilled in performing the corrective action.

12. The method of claim 8, further comprising configuring, by the system, a graphical display representing an equipment relating to the industrial process.

13. The method of claim 8, further comprising generating, by the system, a schedule for the providing.

14. The method of claim 13, wherein the generating includes selecting the data model that provides the schedule.

15. The method of claim 13, wherein the generating includes defining an event, which on detection initiates the providing.

16. A non-transitory computer readable medium comprising computer-executable instructions that, in response to execution cause a system including a processor to perform operations, comprising:
configuring a data model for at least one of collection or transmission of data relating to an industrial process;
retaining the data model;

transferring a data log to at least one of a server data store or a visualization system client in response to a modification of the data model;

transmitting the data relating to industrial process to an enterprise manufacturing intelligence system;

receiving analysis results from the enterprise manufacturing intelligence system comprising a list of actions prioritized based upon an optimized order in which the actions are to be performed to resolve one or more problems associated with the industrial process; and displaying a graphical representation of the analysis results.

17. The non-transitory computer readable medium of claim 16, the operations further comprising sending respective actions to corresponding operators skilled in performing the action.

18. The non-transitory computer readable medium of claim 16, wherein the transmitting includes transmitting the data according to a schedule defined by the data model.

* * * * *